US007927420B2

(12) United States Patent  
Francis

(10) Patent No.: US 7,927,420 B2  
(45) Date of Patent: Apr. 19, 2011

(54) LIGHT WEIGHT METAL FIRE DOOR CORE

(75) Inventor: Hubert C. Francis, Lithonia, GA (US)

(73) Assignee: Georgia-Pacific Gypsum LLC, Atlanta, GA (US)

( * ) Notice: Subject to any disclaimer, the term of this patent is extended or adjusted under 35 U.S.C. 154(b) by 513 days.

(21) Appl. No.: 11/955,472

(22) Filed: Dec. 13, 2007

(65) Prior Publication Data

US 2009/0152519 A1    Jun. 18, 2009

(51) Int. Cl.
C04B 28/14 (2006.01)
B29C 43/00 (2006.01)
E04C 2/00 (2006.01)
C09K 21/00 (2006.01)

(52) U.S. Cl. ........ 106/776; 106/779; 106/780; 106/785; 156/39; 156/42; 156/45; 156/292; 428/70; 428/71; 428/75; 428/76; 428/340; 428/703; 252/62; 252/601; 52/309.15

(58) Field of Classification Search .................. 106/776, 106/779, 780, 785; 156/42; 428/703; 252/62, 252/601
See application file for complete search history.

(56) References Cited

U.S. PATENT DOCUMENTS

| | | | | |
|---|---|---|---|---|
| 2,965,528 | A * | 12/1960 | Loechl | 428/294.7 |
| 3,179,529 | A * | 4/1965 | Hickey et al. | 106/779 |
| 3,988,199 | A | 10/1976 | Hillmer et al. | |
| 4,159,302 | A | 6/1979 | Greve et al. | |
| 4,239,716 | A | 12/1980 | Ishida et al. | |
| 4,343,127 | A | 8/1982 | Greve et al. | |
| 4,557,973 | A | 12/1985 | Ali | |
| 4,695,494 | A | 9/1987 | Fowler et al. | |
| 4,748,771 | A | 6/1988 | Lehnert et al. | |
| 4,811,538 | A | 3/1989 | Lehnert et al. | |
| 5,155,959 | A | 10/1992 | Richards et al. | |
| 5,171,366 | A | 12/1992 | Richards et al. | |
| 5,305,577 | A | 4/1994 | Richards et al. | |
| 5,347,780 | A * | 9/1994 | Richards et al. | 52/204.1 |
| 5,558,710 | A * | 9/1996 | Baig | 106/780 |
| 5,601,888 | A | 2/1997 | Fowler | |
| 5,632,848 | A | 5/1997 | Richards et al. | |
| 5,723,226 | A | 3/1998 | Francis et al. | |
| 5,798,010 | A | 8/1998 | Richards et al. | |
| 5,922,447 | A | 7/1999 | Baig | |
| 5,945,182 | A | 8/1999 | Fowler et al. | |
| 5,945,208 | A | 8/1999 | Richards et al. | |
| 6,299,970 | B1 | 10/2001 | Richards et al. | |
| 6,340,389 | B1 | 1/2002 | Klus | |
| 6,554,893 | B2 | 4/2003 | Klus | |
| 6,648,965 | B2 | 11/2003 | Klus | |
| 6,846,358 | B2 | 1/2005 | Francis | |
| 6,893,752 | B2 * | 5/2005 | Veeramasuneni et al. | 428/703 |
| 2002/0139611 | A1 * | 10/2002 | Baig | 181/286 |
| 2003/0154888 | A1 * | 8/2003 | Yu et al. | 106/772 |
| 2004/0211338 | A1 | 10/2004 | Francis | |
| 2006/0278132 | A1 * | 12/2006 | Yu et al. | 106/772 |
| 2007/0048490 | A1 * | 3/2007 | Yu et al. | 428/70 |
| 2007/0059513 | A1 * | 3/2007 | Yu et al. | 428/304.4 |
| 2007/0251628 | A1 * | 11/2007 | Yu et al. | 156/39 |

* cited by examiner

Primary Examiner — Joseph D Anthony  
(74) Attorney, Agent, or Firm — Joel T. Charlton

(57) ABSTRACT

The present invention describes a fire resistant building material composition, useful for example as a fire door core and to a method of making this composition where the building material of the present invention is prepared from an aqueous slurry of calcined gypsum, paper fibers, a water insoluble organic binder, fiber reinforcement and a set retarder.

9 Claims, No Drawings

LIGHT WEIGHT METAL FIRE DOOR CORE

TECHNICAL FIELD

This invention is in the field of building materials, especially fire-resistant building materials. Specifically, this invention describes a light weight building material composition having utility as an improved core composition for fire-resistant metal doors.

BACKGROUND OF THE INVENTION

Fire doors are generally made for the purpose of stopping or delaying the transfer of thermal energy (i.e., heat), from one side of the door to the other side. Current fire-resistant doors generally contain a fire-resistant core usually encased in a door-shaped shell, wherein the shell is made from various materials generally known to those of ordinary skill in the art. The core is customarily bonded or glued to both inside surfaces of the shell.

Fire doors, as used in residential, commercial, and industrial applications, typically are employed in conjunction with fire walls to provide fire protection between different zones of a structure, and particularly to isolate high fire risk areas of a building from the remainder of the structure, such as the garage of a dwelling from its living quarters. Fire doors usually are not capable of indefinitely withstanding the high temperature conditions of a fire but, rather, are designed to maintain the integrity of the firewall for a limited time to permit the occupants of a building to escape and to delay the spread of fire until fire control equipment can be brought to the scene.

Various tests have been designed for fire doors and are based on factors, such as the time that a given door would withstand a certain temperature while maintaining its integrity, and hose stream tests which involve the door's ability to withstand the forces of a high pressure water stream. The American Society for Testing Materials (ASTM) has devised tests to establish fire door standards and these standards are incorporated into building codes and architectural specifications. One such standard, ASTM Method E 152, requires a door to maintain its integrity for period ranging up to 1.5 hours while withstanding progressively higher temperatures and erosive effects of a high pressure stream of water from a fire hose at the conclusion of the heat (fire) exposure.

Considerations in fire door design, in addition to retarding the advance of fire, include the cost of raw materials and the cost of fabrication. Furthermore, the weight of the door is important, both from the standpoint of ease of handling and cost of transportation. The strength of the door is also an important factor, since fire doors may be required to pass the above-described water stream test as well as have the requisite strength to withstand normal use and abuse.

Fire-resistant doors have been made using a variety of constructions and utilizing a number of different materials, including wood, metal, and mineral materials. Early forms of fire doors simply comprised wooden cores faced with metal sheeting. Although wood of ample thickness is an effective fire and heat retardant, doors of such construction tend to be heavy and are expensive to fabricate and transport.

Some fire-resistant cores are constructed using such materials as expanded perlite (which functions as a lightweight inorganic filler), gypsum (which functions as a fire resistant material bonding the perlite in an integral structure), cement (which functions as a further fire resistant material and counteracts shrinkage of the core), an aqueous solution of polyvinyl alcohol (which acts as an organic binder and increases the viscosity of the mixture of ingredients while also hydrating the gypsum) and fiberglass (which functions as a reinforcing material). See for example U.S. Pat. No. 4,159,302.

According to U.S. Pat. No. 4,159,302 a fire resistant door core can be prepared by hydrating a composition containing about 50-70 percent by weight expanded perlite, about 10-30 percent by weight of calcined gypsum, 10-20 percent by weight of an hydraulic cement, such as Portland cement and 1-5 percent by weight of an organic binder, such as polyvinyl alcohol. The composition to be hydrated can also optionally contain up to 1 percent by weight of a fibrous reinforcement, up to 4 percent by weight clay and up to 4 percent by weight of unexpanded vermiculite. Cores made with this composition are disclosed as having a density between about 22 to about 30 pounds per cubic foot (pcf).

U.S. Pat. No. 5,798,010 (and related U.S. Pat. Nos. 5,155,959; 5,171,366; 5,305,577; 5,945,208 and 6,299,970) describes a fire resistant building composition useful in connection with the manufacture of fire door components. In its broadest aspects, the building material is made from about 53-78% by weight calcium sulfate and 7 to 30% by weight paper fiber and optionally other performance boosting additives including inorganic fiber reinforcement and binder polymer. An aqueous mixture of ingredients is dewatered, pressed, typically at about 300 psi, and dried to produce product having a density between 40 and 75 pounds per cubic feet (pcf) useful as fire door core components.

Other fire doors have included conventional gypsum wallboard panels as a core material. However, in order to produce sufficient fire resistance, the thickness required of the wallboard is such as to result usually in an excessively heavy door. Furthermore, internal structural members such as rails or mullions have been found necessary to support and strengthen wallboard panels. The need for such reinforcing elements increases the cost of materials and assembly of such doors. In addition to the above-mentioned considerations, fire doors must, in order to be commercially acceptable, also have other properties that are related to the manufacture, installation and service of the fire door.

BRIEF DESCRIPTION OF THE INVENTION

The present invention is directed to a fire-resistant building material composition. The present invention is specifically directed to a low density (i.e., lightweight), building material composition, made predominately from a mixture of calcined gypsum and paper fibers, which composition can be used as a fire door core. The fire-resistant building material composition exhibits both an excellent green strength during manufacture and a sufficient strength post-manufacturing to be used as a heat-resistant door core in the manufacture of metal-faced fire doors.

Building material compositions (e.g., fire door cores) of the present invention are prepared by blending with excess water, calcined gypsum in an amount of 50 to 72 percent by weight of the dry ingredients; paper fibers in an amount of 25 to 45 percent by weight of the dry ingredients; a non-water soluble, i.e., water insoluble, organic binder in an amount of 0.5 to 5 percent by weight of the dry ingredients; reinforcement fibers in an amount of 0.2 to 2 percent by weight of the dry ingredients and a set retarder in an amount of up to 0.3 percent by weight of the dry ingredients to form an aqueous slurry. A large excess of water, typically as much as 25 times the amount needed to hydrate the calcined gypsum (or more), then is used to prepare a flowable (or fluid) aqueous slurry suitable for press-dewatering molding to yield a green casting that then can be dried/cured to produce the building material composition.

The building material composition (e.g., fire door core) may also contain, as optional (minor) ingredients unexpanded vermiculite and clay.

DETAILED DESCRIPTION OF THE INVENTION

The fire resistant building material composition of the present invention, preferably made in the form of a fire door core, consists essentially of calcined gypsum as a major component; paper fiber as a significant though minor component; and minor amounts of a non-water soluble, i.e., water insoluble, organic binder; a fiber reinforcement and a set retarder.

The fire resistant building material composition is best characterized in terms of its constituent components (on a dry basis) used to make the composition notwithstanding the fact that at least in the case of the calcined gypsum component there is understood to be a chemical interaction or change that occurs in the presence of water (hydration) during the setting and curing of the composition as the final product is formed.

As noted above, the main constituent of the ingredients used to produce the building material composition (fire door core) of the present invention is calcined gypsum. The calcined gypsum is present in the ingredients for making the building material composition in an amount of 50 to 72 percent by weight of the dry mixture of the constituents used to prepare the composition. Calcined gypsum is in general produced by driving off the water of hydration present in naturally-occurring or synthetically produced gypsum (calcium sulphate dihydrate) through the use of heat. Depending on the degree of calcination, there is produced calcium sulfate hemihydrate ($CaSO_4.1/2H_2O$—Plaster of Paris) or another form of calcium sulfate (such as soluble anhydrate) which thereafter is capable of hydrating with water to form set gypsum, that is, calcium sulphate dihydrate. Calcium sulfate hemihydrate exits in two crystal forms, alpha and beta. While either form can potentially be used in the present invention, the more common and usually less expensive beta-form is totally acceptable and thus most often used.

As is well-known, set gypsum is formed by the recrystallization and rehydration of the calcined gypsum with water. The calcined gypsum is conveniently used in powdered form. As noted above, the calcined gypsum is present as an ingredient for making the building material composition in an amount of 50 to 72 percent by weight of the dry weight of the mixture of the ingredients used to prepare the fire resistant building material composition of the present invention.

The next essential ingredient for making the fire resistant building material composition of the present invention is paper fiber. While the paper fiber could be derived from virgin paper stock fibers, it is more economical to employ recycled, waste paper stock fibers. In the broad practice of the invention, the source of the paper fibers is not critical and the paper fibers may originally be a product of the sulfite process, the sulfate (Kraft paper) process, or some other paper fiber-making process. Waste newspaper fibers are a particularly inexpensive source of paper fibers and provide satisfactory results. The paper fiber is included as an ingredient for making the building composition in an amount of 25 to 45 percent by dry weight of the mixture of the ingredients used to prepare the fire resistant building material composition of the present invention and usually in an amount of at least 30 percent by weight (i.e., 30 to 45 weight percent).

The ingredients necessarily used to produce the fire resistant building material composition of the present invention, especially a fire door core, also include a water insoluble organic binder. The organic binder is generally supplied as a latex emulsion. Suitable emulsions are commercially available and the emulsion particle sizes and solids content are not narrowly critical. The organic binder is present in an amount of 0.5 to 5 percent by dry weight of the mixture of the ingredients used to prepare the fire resistant building material composition of the present invention. The water insoluble organic binder either can be a naturally-occurring material, or a synthetic material.

Examples of naturally occurring water insoluble binders include starches, dextrins and gums, especially starches. One can potentially use any of the wide variety of plant starches that are available including barley starch, corn starch, rice starch, waxy maize starch, waxy sorghum starch, tapioca starch, wheat starch, potato starch, pearl starch, sweet potato starch, and the like, as well as derivatives thereof. While the starch may be pre-cooked, cooked, it is preferably heated sufficiently during the blending of the ingredients to cause gelatinization in situ. An acid-modified corn starch is particularly preferred for use in connection with the preparation of the building material composition.

Examples of water insoluble synthetic materials include resins such as polyvinyl acetate homo-polymers (such as UCAR 130 and UCAR 131), copolymers of vinyl acetate and ethylene, copolymers of ethylene and vinyl chloride, copolymers of styrene and butadiene, copolymers of vinyl acetate and methyl acrylate, and polyacrylic resins. It may be convenient in many cases to introduce a synthetic organic binder polymer as an aqueous emulsion, many of which are commercially available.

Note that any water introduced with the water insoluble organic binder also supplies a portion of the water required by the process for making the ultimate product, i.e., for creating the gypsum slurry and ultimately hydrating the calcined gypsum as the composition sets and cures.

As noted above, the preferred water insoluble organic binder is an acid-treated or acid-modified corn starch that is gelatinized in situ. The water insoluble organic binder is generally included in the ingredients used to prepare the building material composition in an amount of up to about 5 percent by weight, such as from 0.5 to 5 percent, usually about 3 percent or less, such as from 1 to 2 percent, each of these percents based on the dry weight of the ingredients used to form the building material composition, e.g., the fire door core.

Another ingredient necessary for manufacturing the building material composition of the present invention is a set retarder. The set retarder is used to tailor the set time of the aqueous flowable (fluid) slurry so that the excess water can be appropriately removed from the composition during the press molding step. Premature setting of the composition interferes with the necessary removal of this excess water and exacerbates geysering, a condition in which streams of slurry suddenly exit the mold with a great deal of force. Geysering is avoided by applying pressure slowly to the slurry as it is dewatered. Without a set retarder in the formulation, removal of excess water before setting becomes problematic. A set retarder typically is used in the invention in an amount, for example of up to 0.3 weight percent, based on the dry weight of the ingredients used to prepare the building material composition. A suitable set retarder is any substance that reacts with the calcined gypsum to form an insoluble complex and thus interferes with setting. One class of such set retarders comprises divalent or trivalent metal compounds, such as zinc oxide, zinc stearate, sodium citrate, calcium carbonate, magnesium carbonate, magnesium oxide, and zinc sulfate. Still other materials will be apparent to those skilled in the gypsum art.

Yet another important ingredient of the fire resistant building composition of the present invention is a fibrous reinforcement. The fibrous reinforcement ingredient contributes to the desired flexural and compressive strengths and to the general handling characteristics of the composition. While a desired strength characteristic may be achieved without the use of the fibrous reinforcement, this undesirably increases the density of the product. Thus, use of a small but effective amount of a fibrous reinforcement is desirable to produce a suitable product at the low densities characterizing the present invention.

The fibrous reinforcement also imparts impact-resistant properties to the set composition, and provides better handling properties to improve resistance to cracking or breakage during shipment or processing of the door core. As a suitable fibrous reinforcement, inorganic fibers and especially glass fibers are preferred. Examples of other fibrous reinforcements that may be substituted for glass fibers or used in combination therewith are mineral fibers (such as Wollastonite and mineral wool), sisal fibers, graphite fibers, and synthetic fibers such as, for example, polyolefin fibers, such as polyethylene fibers and polypropylene fibers, rayon fiber and polyacrylonitrile fiber. The fiber reinforcement also may further improve the material handling properties of the wet, press molded composite, e.g., the wet door core (often referred to as the "green casting"). Typically, when used, the amount of fiber reinforcement is no more than about 2 percent by weight, such as from 0.2 to 2 percent, usually about 1.5 percent or less, such as from 0.5 to 1.5 percent, more usually, about 1.3 percent, each of these percents based on the dry weight of the ingredients used to form the fire resistant building material composition, e.g., the fire door core.

Still other optional ingredients also may be included in the fire door construction, such as unexpanded verimculite (to enhance fire resistant properties of the set composition and to counteract any tendency to shrink at elevated temperatures thereby imparting improved dimensional stability properties to the set composition during exposure to heat) and clay (to improve fire resistant and high temperature, dimensional stability properties). These optional additional ingredients do not prevent the composition from fulfilling, and in many cases may enhance the compositions utility in fire resistant applications.

Clays are natural, earthy, fine-grained materials, most of which exhibit plastic characteristics when moistened with limited amounts of water. In general, clays comprise primarily alumina, silica and water and may also contain to a lesser extent iron, alkali, alkaline earth and other metals. The various types of clays in general have particles ranging in size from fractions of a micron to about 40 microns, although some materials having particles of an even larger size are also considered clays. It should be understood that materials which do not have all of the above characteristics, but which nevertheless are generally referred to as clays because they have one or more of the above characteristics are included within the term "clay" as used herein. Examples of the types of clay that can optionally be utilized are: kaolinitic clays—including, for example, kaolin (also referred to as china or paper clays), ball clay, fireclay, and flint clay, which clays are comprised predominantly of the clay mineral kaolinite. A preferred clay optionally for use in the practice of the present invention is kaolinite.

The building material composition when used as a fire door core in accordance with the present invention is expected to provide one or more of the following benefits suitable production capabilities using methods known to those of ordinary skill, a satisfactory "green" strength during manufacture notwithstanding the low density of the pressed composite, low raw material consumption, acceptable adhesion to metal door shells, acceptable tensile and flexural strength, decreased weight, and acceptable shaping and handling characteristics.

The phrase "consisting essentially of" when used in connection with the present invention and in the claims is intended to exclude not only the use of ingredients that would destroy the fire resistant property of the composition, but also is intended to exclude the use of other inorganic binders such as a hydraulic cement (e.g., Portland Cement) and silicates in excess of about 5% by weight and the use of asbestos fibers.

As to amounts of ingredients preferably utilized in the practice of the present invention, the fire resistant building material composition comprises the set or cured product of an aqueous mixture (slurry) of the following ingredients, the recited percentages reflecting the total dry weight of the ingredients in the mixture:

(A) about 50 to about 72 wt. % of calcined gypsum;
(B) about 25 to about 45 wt. % of paper fibers;
(C) about 0.5 to 5 wt. % of a water insoluble organic binder;
(D) up to about 2 wt. % and preferably about 0.2 to 2 wt % of fibrous reinforcements, and
(E) up to about 0.3 wt. % of a set retarder.

The building material composition, e.g., fire door core, of the present invention can be manufactured in a manner analogous to the procedure used to form the fireboard components of U.S. Pat. No. 5,798,010 as illustrated in FIG. 1 of that patent, which is incorporated herein by reference. In particular, the building material composition is manufactured in a straightforward manner by combining the various components (many supplied as dry ingredients) with water to form a flowable (fluid) aqueous slurry. The amount of water used in making the aqueous slurry that ultimately sets to form the composition, such as a door core, is well in excess of the stoichiometric amount of water needed to cause the setting (curing) of the calcined gypsum, i.e., the amount of water is as much as twenty-five times the stoichiometric water requirement for hydrating (curing) the calcined gypsum or more. During the press molding step, this quantity of water is significantly reduced to where the residual water in the press-molded green casting constitutes about 75 to about 90% by weight of the dry weight of the ingredients originally comprising the aqueous slurry. This residual water is then removed from the core during the drying step or serves to hydrate the calcined gypsum.

Thus, in one preferred manufacturing approach, a source of paper fibers, e.g., waste newspaper, together with water, possibly as much as twenty times as much water by weight as paper is added to a pulper and the mixture is thoroughly agitated to form a pulp, i.e., a substantially homogeneous suspension of paper fibers. A source of reinforcement fibers, such as a glass wool, can be separately pulped, also in a large excess of water. Then, the separately pulped suspensions of glass and paper fibers can be combined and this combination can be added to a mixing vessel along with the insoluble organic binder, the calcined gypsum, the set retarder and any additional water needed to produce a flowable (fluid) slurry.

This wet mixture or flowable slurry, e.g., the wet door core mixture, then is press molded, for example in a hydraulic press, to dewater the slurry and form a wet composite, e.g., a wet door core or green casting. The combination of the level of paper fibers in the formulation and the pressure employed in the press molding operation determines the density of the final product, with building material composition densities in the range of about 18 pounds per cubic foot (pcf) to about 23 pcf being typical. For the metal door core application, a density of below about 20 pcf is often preferred. Gradually, compressing the slurry to a final pressure of about 90 to 170 psi should be sufficient in most instances.

The wet composite, e.g., wet door core, then is dried (set and cured), for example by conveying the green casting into and through an oven, to form the fire resistant building material composition, e.g., the fire door core, of the present invention. Oven temperatures in the range of about 150° to about 300° Fahrenheit (about 65° to 150° C.), for a time of from about 4 to about 8 hours should be sufficient in most cases. Thereafter, the dried set casting may be sanded to a desired thickness and/or cut to desired dimensions using conventional equipment. Such operations can be adapted to either a batch or continuous process.

One of the surprising discoveries of the present invention is that notwithstanding the high amount of paper fibers and the low density of the molded product, the wet composite (green casting) exhibits an excellent green strength facilitating the handling of the wet composite through the remainder of the manufacturing operations.

In accordance with the present invention, the above-described semi-continuous batch press mold method provides a suitable way for producing product of the fire-resistant building material composition of the present invention. Mixing devices suitably used in this process are well known to skilled practitioners.

As alternative to the above-described semi-continuous batch press molding method, a continuous press-molding process also could be used in which the flowable (fluid) aqueous slurry is formed into a sheet of indefinite length by use of standard paper-making (and gypsum wallboard) techniques. In particular, the flowable slurry could be fed from a head box of the type associated with a paper-making machine to a foraminous moving belt through which water drains (possibly with a vacuum assist) as the solid ingredients are compressed and cured. The resulting composite is consolidated (compressed) by passing the endless slab through converging press rollers. Thereafter, heated rollers could be used to assist the drying of the green composite.

The press molding step of the present invention, whether continuous or semi-continuous, can use any means of imparting pressure to the flowable slurry for dewatering and then densifying the wet mixture of ingredients. Such equipment is well-known to skilled practitioners. Typically, the level of pressure and the duration of the press molding step are sufficient to bind the ingredients together in an self sustaining green casting that on drying yields a composition, e.g., a door core, that has a density from about 18 to about 23 pounds per cubic foot (pcf), more usually about 18 to about 20 pcf. Again, it is expected that satisfactory results will be obtained utilizing pressures within the range of about 90 to about 170 psi for about 15 to about 55 seconds These conditions should produce a self-supporting green casting, such as having a compression strength of at least 50 psi. As skilled practitioners will recognize, the exact pressure and time required will vary for different embodiments of the present invention and suitable pressure and time schedules can be determined using only routine testing. The wet composite, e.g., the wet door core then is transferred to a drying area, e.g., an oven.

The wet composite, e.g., wet door core, then is dried (cured) to produce the building material composition, e.g., the fire door core of the present invention. The wet composite, e.g., the wet door core is cured (i.e., dried) at a temperature and for a time sufficient to substantially eliminate excess water from the wet composite, e.g., from the wet door core. Although the drying can be accomplished at ambient temperature, drying at elevated temperatures may often be preferred. For example, drying of the wet composite, e.g., the wet door core, may be carried out at a temperature from about 150° to about 300° Fahrenheit (about 65° to 150° C.), for a time from about 4 to about 8 hours, with lower temperatures requiring longer times. Skilled practitioners recognize that specific curing times and temperatures will depend on the exact composition of the wet composite, e.g., the wet door core and suitable temperature and time schedules can be determined using routine testing.

After the core has been dried, finishing operations can be effected. For example, the core can be sanded to a thickness within the required tolerance, sawed or shaped as desired. The nature of the dried material is such that finishing operations can be performed readily. Thereafter the material can be used to assemble the door, preferably a metal door construction where a metal facing (metal sheet) encases the door core composition of the present invention.

During the course of finishing operations such as sanding and sawing, core dust is produced. In accordance with this invention, it is anticipated that the dust can be used in preparing other cores by including it in the mixture from which the core is made. This is advantageous because it makes use of a material that would otherwise be waste requiring disposal. The use of core dust is expected to increase the density of the core. Accordingly, the maximum amount of core dust used will be governed by the desired density of the core. It is recommended that the core dust comprise no more than about 6 wt. % of the total dry weight of the mixture of ingredients. Preferably, the core dust should comprise no more that about 2 to about 4 wt. % of the mixture.

The following non-limiting example further illustrates the invention.

Example 1

A door core of the present invention of the following composition can be manufactured from an aqueous slurry of the following ingredients:

| Ingredients | Amount (dry weight percent) |
| --- | --- |
| Calcined Gypsum (hemihydrate) | 67.2 |
| Newspaper fibers | 30.0 |
| Starch | 1.4 |
| Glass Fibers | 1.3 |
| Set Retarder | 0.1 |

Water in an amount of about 7 to 15 times the weight of the dry ingredients should be added and the door core can be produced by pressing the aqueous slurry at about 150 psi to dewater the slurry and then compress the dewatered slurry, followed by drying (curing) the pressed core at about 250° F. (120° C.) for about 4-5 hours.

It will be understood that various changes in the details, materials and arrangements of parts which have been herein described and illustrated in order to explain the nature of the invention, may be made by those skilled in the art within the principle and scope of the invention as expressed in the appended claims. Unless otherwise specifically indicated, all percentages are by weight. Throughout the specification and in the claims the term "about" is intended to encompass + or −5%.

I claim:

1. A building material composition useful as a fire door core, comprising a dewatered, dried and cured composition consisting essentially of a fluid aqueous slurry of calcined gypsum, paper fibers, a water insoluble organic binder, fiber reinforcement and a set retarder wherein said aqueous mixture contains on a dry weight basis, about 50 to 72 percent of the calcined gypsum, about 25 to 45 percent of the paper fiber, about 0.5 to 5 percent of the water insoluble organic binder, about 0.5 to 2 percent of the fiber reinforcement and up to about 0.3 percent of the set retarder, wherein the fluid aqueous slurry can be press molded to dewater the slurry and wherein the building material composition has a density of from 18 to about 23 pounds per cubic foot.

2. The building material composition of claim 1 wherein the water insoluble organic binder is a starch.

3. The building material composition of claim 2 wherein the fiber reinforcement is glass fiber.

4. A building material composition prepared by dewatering, drying and curing a fluid aqueous slurry of calcined gypsum, paper fibers, a water insoluble organic binder, fiber reinforcement and a set retarder wherein said aqueous mixture contains on a dry weight basis, about 50 to 72 percent of the calcined gypsum, about 25 to 45 percent of the paper fiber, about 0.5 to 5 percent of the water insoluble organic binder, about 0.5 to 2 percent of the fiber reinforcement and up to about 0.3 percent of the set retarder and wherein the building material composition has a density of from 18 to about 23 pounds per cubic foot.

5. The building material composition of claim 4 wherein the water insoluble organic binder is starch.

6. The building material composition of claim 5 wherein the fiber reinforcement is glass fibers.

7. A method for making a fire door core from a fluid aqueous mixture of materials, which method comprises mixing water, calcined gypsum, paper fibers, a water insoluble organic binder, fiber reinforcement and a set retarder, wherein, on a water-free, dry weight basis, the aqueous mixture contains about 50 to 72 percent of the calcined gypsum, about 25 to 45 percent of the paper fiber, about 0.5 to 5 percent of the water insoluble organic binder, about 0.2 to 2 percent of the fiber reinforcement and up to about 0.3 percent of the set retarder, the water being present in an amount in excess of the stoichiometric amount needed to hydrate the calcined gypsum and sufficient to provide a fluid slurry, placing a charge of the fluid slurry in a pressure mold, applying sufficient pressure to the fluid slurry in the mold to dewater the fluid slurry and maintaining the pressure until a self-supporting compressed charge comprising a press-molded slab is produced, removing the press-molded slab from the mold and thereafter drying the slab by heating it sufficiently to remove excess water, wherein the slab has a density of from 18 to about 23 pounds per cubic foot.

8. The method of claim 7 wherein the water insoluble organic binder is a starch.

9. The method of claim 8 wherein the fiber reinforcement is glass fibers.

* * * * *